(12) United States Patent
Trull et al.

(10) Patent No.: US 9,414,537 B2
(45) Date of Patent: Aug. 16, 2016

(54) BULK MEDIA SPREADER TRANSVERSAL ACTUATOR ASSEMBLY WITH KINEMATIC HYPEREXTENSION PREVENTION

(71) Applicant: DNI Enterprises, LLC, Winfield, AL (US)

(72) Inventors: Joseph K. Trull, Winfield, AL (US); James C. Gary, Winfield, AL (US); Van T. Walworth, Lebanon, TN (US)

(73) Assignee: DNI Enterprises, LLC, Winfield, AL (US)

( * ) Notice: Subject to any disclaimer, the term of this patent is extended or adjusted under 35 U.S.C. 154(b) by 172 days.

(21) Appl. No.: 14/213,514

(22) Filed: Mar. 14, 2014

(65) Prior Publication Data

US 2014/0263762 A1    Sep. 18, 2014

Related U.S. Application Data

(60) Provisional application No. 61/852,544, filed on Mar. 18, 2013.

(51) Int. Cl.
*A01C 17/00* (2006.01)
*A01C 19/02* (2006.01)

(52) U.S. Cl.
CPC .............. *A01C 19/02* (2013.01); *A01C 17/005* (2013.01); *A01C 17/001* (2013.01); *A01C 17/006* (2013.01); *Y10T 74/18568* (2015.01)

(58) Field of Classification Search
CPC ...... A01C 7/085; A01C 15/06; A01C 15/006; A01C 17/001; A01C 17/005; A01C 17/006; A01C 19/02; A01C 21/005; E01C 19/203; E01C 19/2025; Y10T 74/18568

USPC ......... 239/379, 650, 661, 663, 668, 670, 676, 239/677, 681; 74/527, 529, 536
See application file for complete search history.

(56) References Cited

U.S. PATENT DOCUMENTS

| 3,964,681 A * | 6/1976 | Herd | A01G 17/00 222/610 |
| 6,572,209 B2 * | 6/2003 | Koepff | B60R 11/00 312/319.5 |
| 2003/0164416 A1* | 9/2003 | Sauls | A01C 7/08 239/650 |
| 2010/0006666 A1* | 1/2010 | Kendall | A01C 17/001 239/11 |

FOREIGN PATENT DOCUMENTS

NL    EP 0463670 A1 *  1/1992  .......... A01C 17/006

* cited by examiner

*Primary Examiner* — Arthur O Hall
*Assistant Examiner* — Cody Lieuwen
(74) *Attorney, Agent, or Firm* — Harness, Dickey & Pierce P.L.C.

(57) ABSTRACT

A bulk media spreader transversal actuator assembly includes a drive converter. A motor is connected to the drive converter. A linear motion shaft is slideably positioned in a shaft housing. The shaft housing is connected to the drive converter and the linear motion shaft is connected to the drive converter such that rotational operation of the motor is converted to a linear motion of the linear motion shaft by the drive converter. A hyperextension prevention device is connected to the linear motion shaft and to a rotatable lever of a bulk media spreader. Rotatable displacement of the lever by extension or retraction of the linear motion shaft acts to change an operating position of a hopper gate through which media in the bulk media spreader is dispensed.

9 Claims, 10 Drawing Sheets

BULK MEDIA SPREADER TRANSVERSAL ACTUATOR ASSEMBLY WITH KINEMATIC HYPEREXTENSION PREVENTION

CROSS-REFERENCE TO RELATED APPLICATIONS

This application claims the benefit of U.S. Provisional Application No. 61/852,544, filed on Mar. 18, 2013. The entire disclosure of the above application is incorporated herein by reference.

FIELD

The present disclosure relates to spreaders used for fertilizer and seed delivery having a power actuated device to operate a spreader gate.

BACKGROUND

This section provides background information related to the present disclosure which is not necessarily prior art.

Spreader equipment used as farm implements broadcast dry bulk media such as seed, fertilizer, nutrients, and such, in a controlled pattern. Settings on the spreader establish a gate opening at the bottom of a hopper through which the media is gravity fed onto a throwing device. The throwing devices are commonly axially rotated for scattering the media radially outward from the gate opening. The size of the gate opening controls the volume of media dispensed. The gate opening in known spreaders is controlled by a manual lever, usually constructed to include an extended handle.

There are several variants of spreader devices and quite a range of capacities of spreader equipment in the market place, offered by numerous vendors. Most spreader devices require the use of a tractor mount and a power take-off (PTO) to axially rotate the throwing device, while other spreader devices are pull-behind versions. Most spreaders require the tractor operator to stop and get off the tractor in order to open, close or adjust the setting of the gate of the spreader. The gate may be closed for example at the end of each field row of delivery prior to turning the tractor for dispersal in a subsequent row. Manual control of the gate is problematic, however, even if the operator is able to reach the extended gate opening handle of the spreader from the tractor seated position, because the operator is forced to assume an unsafe position relative to driving and maintaining control of the tractor.

In order to maintain safe control of the tractor, many operators opt to save time and avoid stopping to open and shut the gate at the ends of field rows. Each growing season, farmers lose large amounts of bulk media due to being spread in unwanted places. If a farmer or operator takes the time to deliberately and constantly stop the tractor when activating the gate, unproductive time is incurred. Known actuator control mechanisms are mostly original equipment options built in place and are not releasably connected to the spreader device. Known actuator controls that are releasably connected from spreader devices are not connectable or adaptable to other variations of spreader equipment.

SUMMARY

This section provides a general summary of the disclosure, and is not a comprehensive disclosure of its full scope or all of its features.

An adaptive and functional conversion assembly kit design provides the tractor operator a safe and convenient gate opening control device. The control device includes a retractably extendible unit such as provided by an electric actuator, air cylinder, hydraulic cylinder, rack and pinion mechanism, or any one of numerous methods promoting a suitable travel distance of linear motion.

The control device of the present disclosure includes a first kinematic linkage adapting to a fixed end of a linear motion promoter such as to a spreader structure and a second kinematic linkage adapting to a moving end of the linear motion promoter such as a gate control member. According to several aspects, the first kinematic linkage is disconnectedly connected to a spreader frame or the hopper itself. The second kinematic linkage is disconnectedly connected to a gate opening mechanism manual lever. The first and second kinematic linkages include swivel connections for alignment, and thereby provide variable adjustment adaptation. In addition, the first and second kinematic linkages include a hyperextension prevention device to accommodate greater linear motion than the linear motion promoter is able to provide so that the control device is prevented from hyperextending the kinematic linkage components.

The present disclosure provides an adaptable assembly for mounting to most known spreader devices capable of controlling a gate opening mechanism. A plethora of spreader equipment in the market place manufactured and sold in dozens of brand names, in multiple dozens of sizes, gate control variations, and operational differentiations can be accommodated by the control device of the present disclosure.

The control device of the present disclosure prevents hyperextension of linkage components by incorporating a hyperextension absorption linkage. The hyperextension absorption linkage rotates and/or swivels allowing full stroke linear motion travel extension to transpire. The hyperextension absorption linkage prevents hyperextension damage from resulting at both linear extension and retraction positions. A first axis line is defined as passing through an attachment pin connecting the first kinematic linkage. A second axis line is defined as passing through an attachment pin connecting a second kinematic linkage. A third axis line is defined as passing transversely through both the first and second axis lines.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
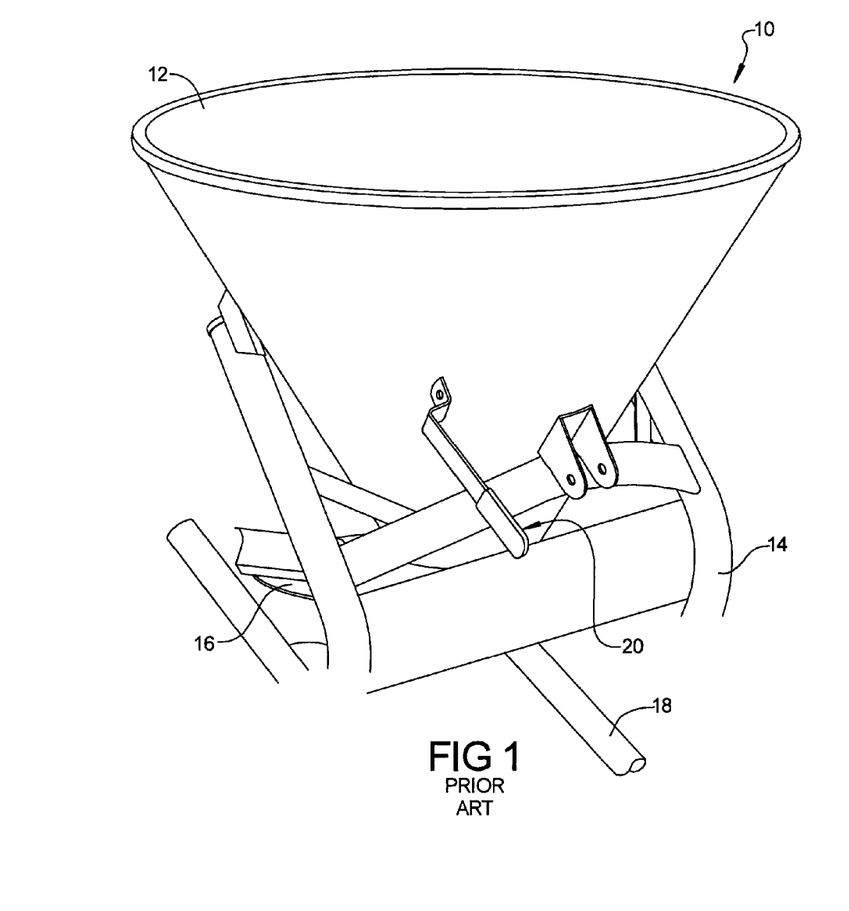
FIG. 1 is a front right perspective view of a prior art spreader having a PTO drive.

Referring to FIG. 1, a spreader device 10 used for dispersal of a bulk media, such as seed, fertilizer, nutrients, and the like, commonly includes a cone-shaped hopper 12 in which the media is held during operation. The hopper 12 is fixed to a frame 14 which also rotatably supports a throwing device 16 directly below the hopper 12. The throwing device 16 can be axially rotated by operation of a power takeoff (PTO) drive 18 which is connected to a powered device such as a farm tractor engine. In order to control the volume of the bulk media delivered by the throwing device 16, the spreader device 10 also includes a gate control lever assembly 20 which is used to incrementally open or close a gate (not visible in this view) through which the bulk media is dispersed. In the common design of the spreader device 10 used in the industry, the gate control lever assembly 20 is connected to the hopper 12 but is difficult to access by the operator of the farm implement during operation of the hopper 12. Also, the gate control lever assembly 20 is normally fixed at a predetermined position based on the type of bulk media that is being spread for the dispersal rate desired. It is therefore common that the operator of the farm implement must stop and manually move the position of the gate control lever assembly 20 to either open, close, or adjust the position of the gate of the hopper 12.

Referring to FIG. 2 and again to FIG. 1, known spreader devices 10 provide the following features for the gate control lever assembly 20. A manual gate lever 22, which is typically a metal flattened bar, is rotatably connected to an indicator frame 24 using a lever rotational fastener 26. A friction lock member 28 is commonly provided to assist in fixing the desired position for the manual gate lever 22. A rotation link 30, extending from the manual gate lever 22, extends beyond the lever rotational fastener 26.

Figure 2:
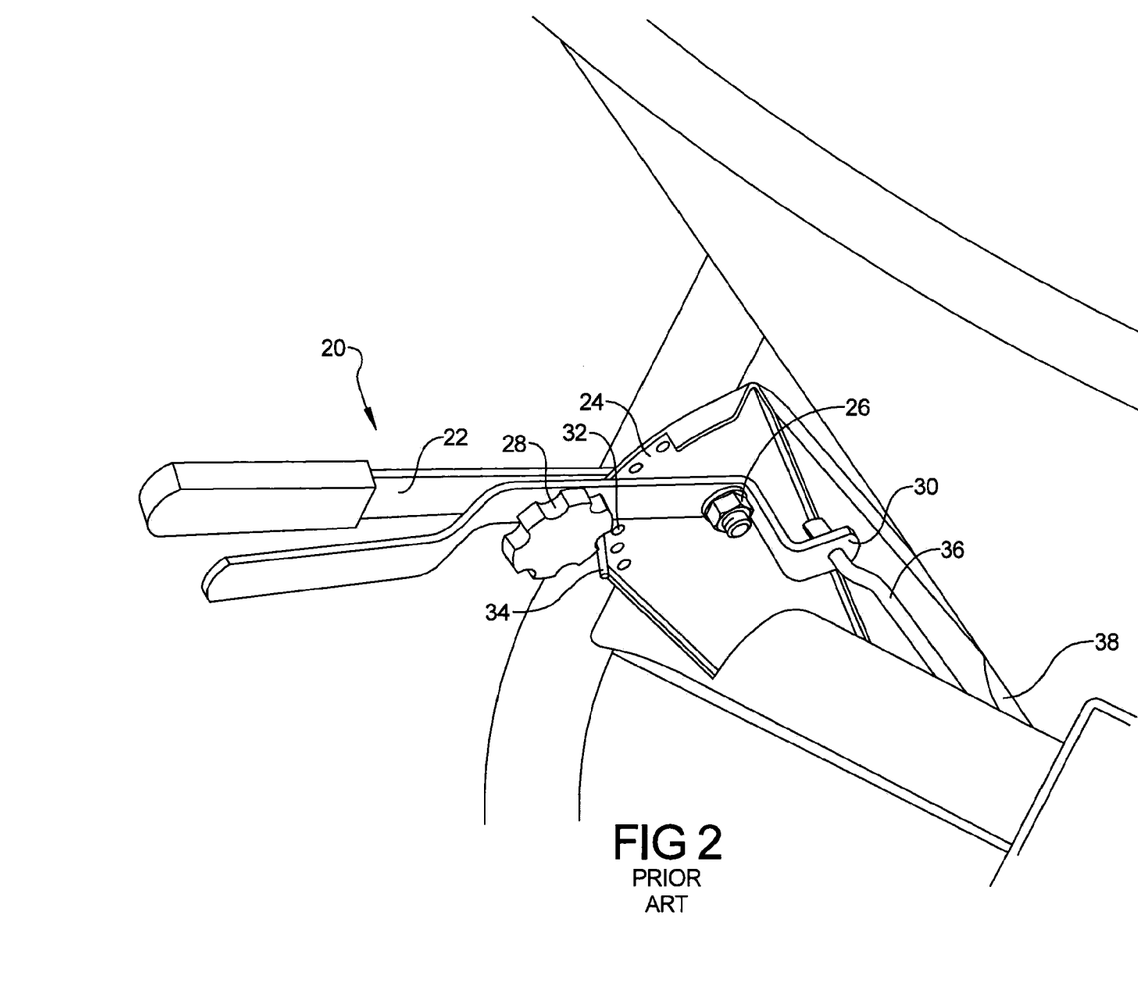
FIG. 2 is a front left perspective view of a manual gate control operator for the spreader of FIG. 1.

A plurality of gate setting apertures 32 are commonly provided with the indicator frame 24 through which a gate setting pin 34 is extended to prevent displacement of a gate control link 36 which is connected to an adjustable position hopper gate 38. Hopper gate 38 is adjustable between a closed position which prevents media contained in the hopper 12 from being dispensed to the throwing device 16 to a fully open position allowing media to drop by gravity from hopper 12 onto the throwing device 16, and multiple positions therebetween. In known manual systems, when a different setting of the hopper gate 38 is desired, the operator reduces the tension on the friction lock member 28, removes the gate setting pin 34, and manually rotates the manual gate lever 22 with respect to an axis of rotation defined by the lever rotational fastener 26 until the desired position of the hopper gate 38 is reached, and then re-sets the friction lock member 28 and the gate setting pin 34. A visual scale, which is not visible in this view, is also commonly provided with the indicator frame 24 to visually indicate to the operator the position of the hopper gate 38.

Referring to FIG. 3 and again to FIGS. 1-2, in order to provide for remote powered actuation of the gate control lever assembly 20, a transversal actuator assembly 40 of the present disclosure is connected to both the hopper 12 and the gate control level assembly 20. Transversal actuator assembly 40 provides for remote powered operation by the operator of the farm implement without the operator having to stop the implement and manually control the position of the gate control lever assembly 20. Transversal actuator assembly 40 is connected to hopper 12 using a hopper bracket 42 having a bracket arm extending outward and away from hopper 12. An axial fastener 44 is received in the bracket arm, and provides for limited axial rotation of the transversal actuator assembly 40 to accommodate different sized hoppers 12. A clevis 46 such as a U-shaped bracket is connected using axial fastener 44 to each of the hopper bracket 42 and the transversal actuator assembly 40. This is accomplished using a pin 48 which is received through the U-shaped clevis 46 rotatably connected to a drive converter 50.

Figure 3:
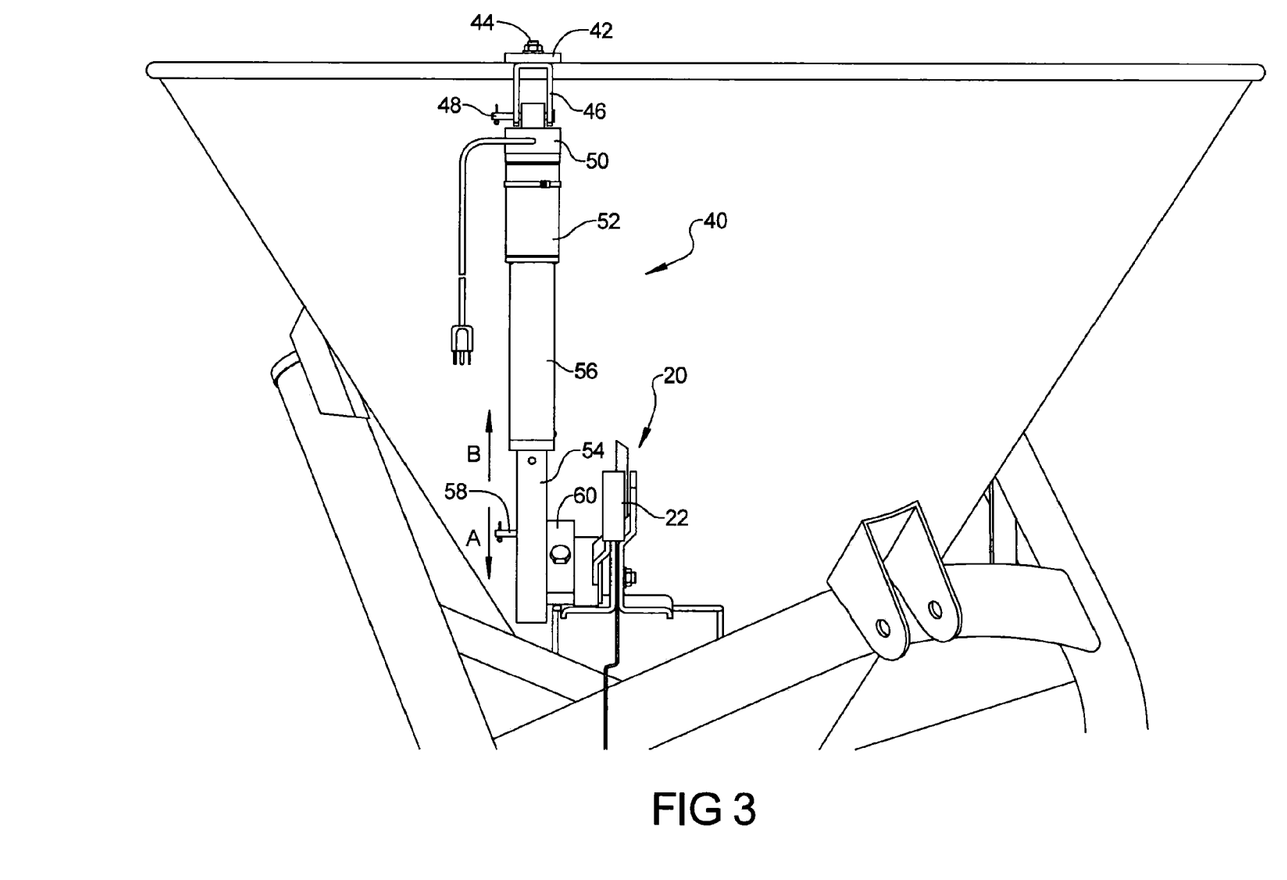
FIG. 3 is a front right perspective view of the prior art spreader of FIG. 1 further including a traversal actuator assembly of the present disclosure connected to the manual gate control operator.

Power for operation of transversal actuator assembly 40 can be provided by multiple devices, including an electric actuator or motor, an air cylinder, a hydraulic cylinder, a rack and pinion mechanism, or any one of numerous methods promoting a suitable travel distance of linear motion. According to several aspects and as one example, the drive converter 50 provides an internal configuration of gears and/or drive assembly to use the powered operation of an electric motor 52, such as a DC motor, so that the rotational operation of motor 52 can be converted to a linear motion for extension or retraction of a linear motion shaft 54 with respect to a shaft housing 56. According to several aspects the shaft housing 56 is fixed to the motor 52. A free end of the linear motion shaft 54 is connected using a mounting pin 58 to a clutch or hyperextension prevention device 60. The hyperextension prevention device 60 is, in turn, fixedly connected to the manual gate lever 22 such that linear extension or retraction in either of an extension direction "A" or retraction direction "B" of the linear motion shaft 54 rotatably displaces the manual gate lever 22. The transversal actuator assembly 40 is therefore designed as a kit of component parts that are adapted to be used on multiple different hoppers 12 and multiple different gate control lever assemblies 20, as will be further described herein.

Referring to FIG. 4 and again to FIG. 3, features of the hyperextension prevention device 60 include a plastic housing 62, which is generally rectangular in shape, which axially and rotatably receives a rotational motion sleeve 64. The rotational motion sleeve 64 is cylindrical in shape and rotates with respect to a rotational axis 66. The rotational motion sleeve 64 is retained with respect to housing 62 using a first cover plate 68 positioned in contact with a first outer face 70 of the housing 62. Oppositely directed with respect to first cover plate 68 is a lever connection ring 72 which is mounted with respect to a second outer face 74 oppositely directed with respect to first outer face 70. The lever connection ring 72 is also generally cylindrically shaped, but further includes a longitudinal slot 76 which receives and matingly engages with the manual gate lever 22. The manual gate lever 22 is retained within the longitudinal slot 76 using a second cover plate 78 which is oppositely directed with respect to first cover plate 68. The first cover plate 68 and the second cover plate 78 are coupled together with the lever connection ring 72 and the rotational motion sleeve 64 using cover plate fasteners 80, 80'.

Figure 4:
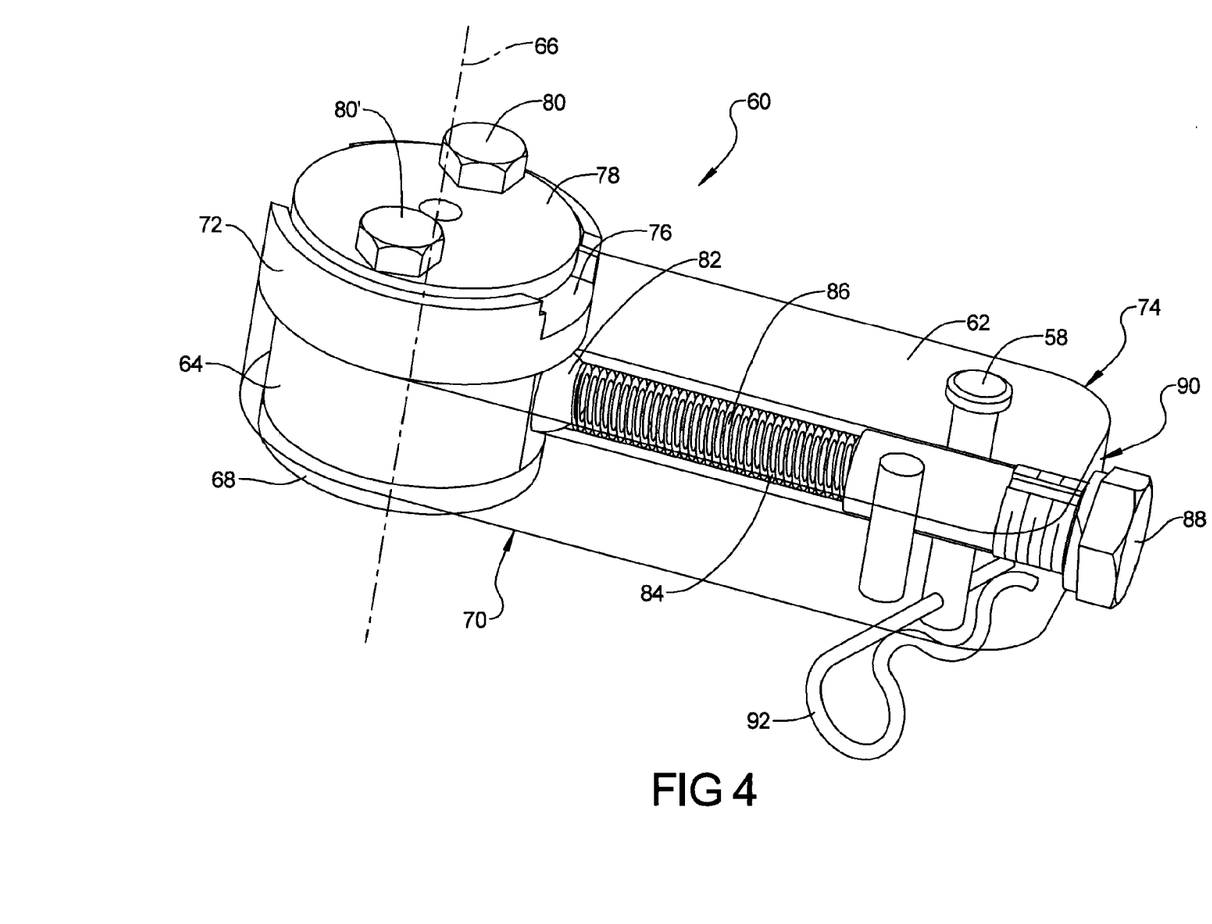
FIG. 4 is a top perspective view of a hyperextension prevention linkage of the present disclosure.

According to several aspects, the bulk media spreader transversal actuator assembly 40 includes drive converter 50; motor 52 connected to the drive converter 50; and linear motion shaft 54 slideably positioned in shaft housing 56. The shaft housing 56 is connected to the drive converter 50 and the linear motion shaft 54 is connected to the drive converter 50 such that rotational operation of the motor 52 is converted to a linear motion of the linear motion shaft 54 by the drive converter 50. The hyperextension prevention device 60 is connected to the linear motion shaft 54 and to the rotatable lever 22 bulk media spreader 10. Rotatable displacement of the lever 22 by extension or retraction of the linear motion shaft 54 acts to change an operating position of the hopper gate 38 through which media in the bulk media spreader 10 is dispensed.

Hyperextension prevention device 60 is used to prevent overextension of the components of the transversal actuator assembly 40 and provides several features to prevent this overextension. A rotation engagement ball 82 is biased into direct contact with the rotational motion sleeve 64 using the biasing force of a biasing member 84. The biasing member 84 can be any type of spring device including a coiled spring which is slideably positioned within a bore 86 transversely oriented with respect to the outer wall of rotational motion sleeve 64. A tension adjustment screw 88, which partially outwardly extends from a housing end face 90 of the housing 62, directly contacts the biasing member 84 in the bore 86 and when rotated allows for increasing or decreasing the biasing force of biasing member 84 acting on the rotation engagement ball 82. A mounting clip 92 is also provided which couples the mounting pin 58, previously described, which is used to rotatably connect the hyperextension prevention device 60 to the gate control lever assembly 20.

Referring to FIG. 5 and again to FIG. 4, further features of the hyperextension prevention device 60 include a cylindrical cavity 94 created within the housing 62 which is sized to rotatably receive the rotational motion sleeve 64 with the rotational motion sleeve 64 abutting against a cavity end wall 96 of the cylindrical cavity 94. The rotational motion sleeve 64 includes a first sleeve bore 98 and a proximally located second sleeve bore 100 which are both oppositely displaced across from the outer walls of rotational motion sleeve 64 with respect to third and fourth sleeve bores 102, 103 (fourth sleeve bore 103 is not visible in this view). A sleeve center bore 104 is axially aligned with respect to the rotational axis 66 of rotational motion sleeve 64. A V-shaped notch 106 is also provided in an outer facing wall of the rotational motion sleeve 64, which is sized to receive a portion of the rotation engagement ball 82, rotation engagement ball 82 when positioned in the V-shaped notch 106 defining a detent position of the hyperextension prevention device 60 resisting rotation of the rotational motion sleeve 64 with respect to housing 62 under the biasing force of biasing member 84.

Figure 5:
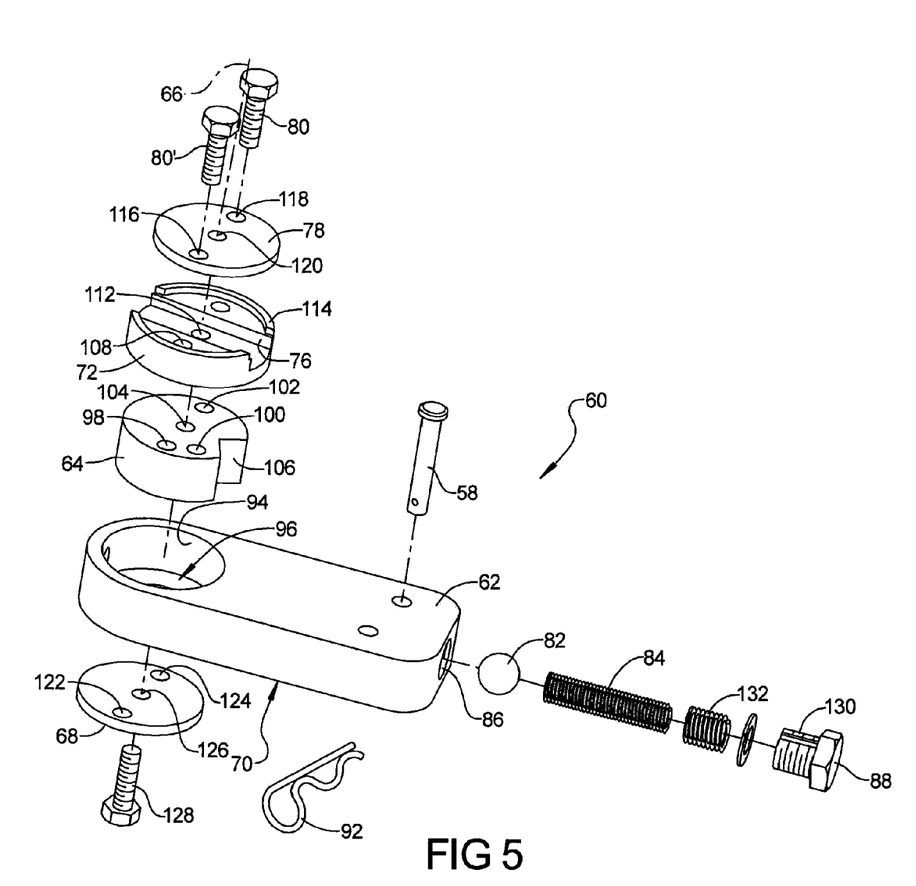
FIG. 5 is an exploded assembly view of the hyperextension prevention linkage of FIG. 4.

The lever connection ring 72 includes each of a first ring bore 108, which is coaxially aligned with one of the first or second sleeve bores 98, 100 of the rotational motion sleeve 64, and a second ring bore 110, which is coaxially aligned with one of the third or fourth sleeve bores 102, 103. A ring center bore 112 of lever connection ring 72 is coaxially aligned with respect to sleeve center bore 104 also with respect to the rotational axis 66. A raised outer wall 114 is subdivided by the longitudinal slot 76 and creates an inset within which the second cover plate 78 is received.

The second cover plate 78 includes a plate first bore 116, which is coaxially aligned with the first ring bore 108, and one of the first or second sleeve bores 98, 100. A plate second bore 118 is similarly coaxially aligned with the second ring bore 110 and one of the third or fourth sleeve bores 102, 103. A plate center bore 120 of the second cover plate 78 is coaxially aligned on rotational axis 66 with the ring center bore 112 and the sleeve center bore 104. The first cover plate 68 also includes a cover plate first bore 122, which is coaxially aligned with one of the first or second sleeve bores 98, 100, the first ring bore 108, and the plate first bore 116. Similarly, a cover plate second bore 124 of first cover plate 68 is coaxially aligned with one of the third or fourth sleeve bores 102, 103, the second ring bore, and the plate second bore 118.

With each of the bores aligned as previously described, the cover plate fasteners 80, 80' are extended through the coaxially aligned bores to couple the first cover plate 68 to the second cover plate 78 having the lever connection ring 72 and the rotational motion sleeve 64 positioned therebetween. With the cover plate fasteners 80, 80' installed, a housing mount fastener 128 is slideably received through each of the cover plate center bore 126, the sleeve center bore 104, the ring center bore 112, and the plate center bore 120 such that the housing mount fastener 128 can be used to rotatably couple the hyperextension prevention device 60 to the gate control lever assembly 20.

With the rotation engagement ball 82 and the biasing member 84 positioned within bore 86 of housing 62, a threaded shank 130 of the tension adjustment screw 88 is threadably received in a threaded insert 132, which is fixed in the bore 86, which allows a metal tension adjustment screw 88 to be retained within the bore 86 while providing good holding capability to retain the tension adjustment screw 88. As previously noted, the V-shaped notch 106 in the outer facing wall of the rotational motion sleeve 64 receives a portion of the rotation engagement ball 82, thereby acting as a detent against rotation of the rotational motion sleeve 64 under the biasing force of biasing member 84. When a rotational force received by the displacement of the gate control lever assembly 20 exceeds a force applied on rotation engagement ball 82 by biasing member 84, the rotation engagement ball 82 slips out of the V-shaped notch 106 thereafter allowing free rotation of the gate control lever assembly 20 preventing an over-torque condition on the gate control lever assembly 20. The rotation engagement ball 82 can be returned to its contact position with V-shaped notch 106 after the over torque condition is removed.

Figure 6:
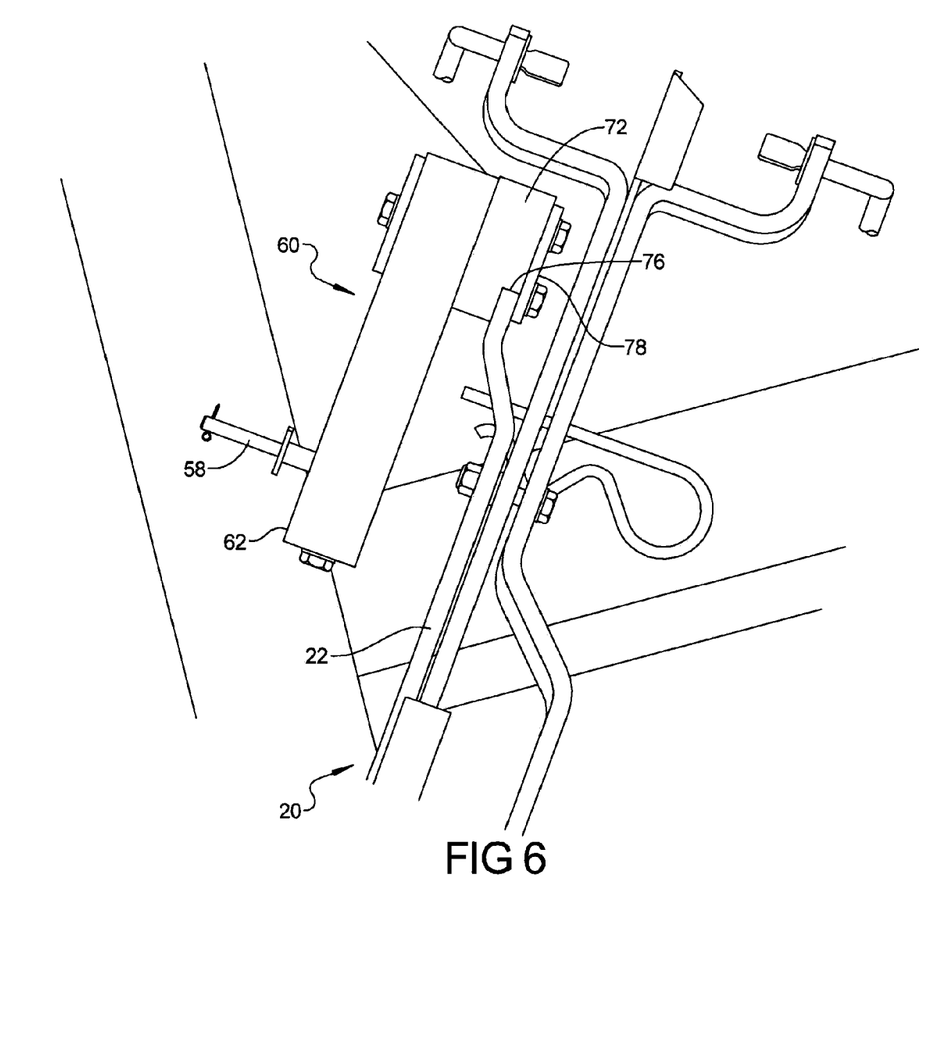
FIG. 6 is a top plan view of the installed position of the hyperextension prevention linkage of FIG. 3.

Referring to FIG. 6 and again to FIGS. 1-5, the hyperextension prevention device 60 is shown following installation onto the manual gate lever 22 of gate control lever assembly 20. A portion of the manual gate lever 22 is received within the longitudinal slot 76 of lever connection ring 72 and retained by the second cover plate 78. In this configuration, the housing 62 can freely rotate with respect to lever connection ring 72 with mounting pin 58 connected to the linear motion shaft 54 of transversal actuator assembly 40.

Figure 7:
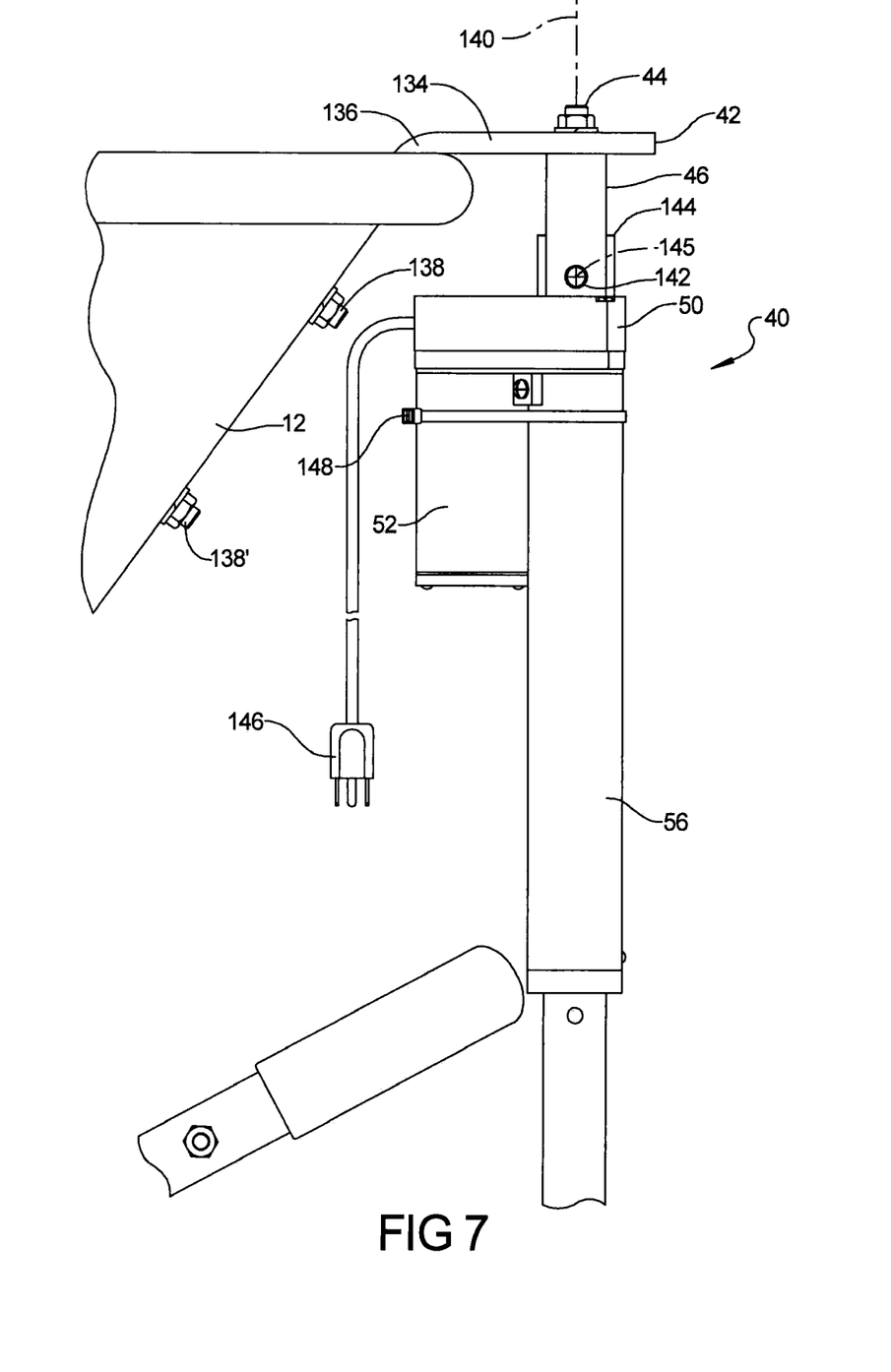
FIG. 7 is a right side elevational view of the traversal actuator assembly of FIG. 3.

Referring to FIG. 7 and again to FIGS. 1-3, the transversal actuator assembly 40 is shown in a partially installed condition. The hopper bracket 42 includes a bracket first leg 134 to which the axial fastener 44 is connected. A bracket second leg 136 of hopper bracket 42 is positioned within the inner wall of hopper 12 and fixed to hopper 12 using hopper fasteners 138, 138'. An actuator central axis of rotation 140 is defined through the axial fastener 44 such that U-shaped clevis 46 can rotate axially with respect to the actuator central axis of rotation 140. A mounting pin 142, extending through the U-shaped clevis 46 and through a raised boss 144 extending from the drive convertor 50, allows the shaft housing 56 as well as the motor 52 to rotate with respect to an actuator body axis of rotation 145. The actuator body axis of rotation 145 permits the transversal actuator assembly 40 to rotate toward or away from the hopper 12 while the actuator central axis of rotation 140 allows the axial rotation of shaft housing 56, thereby providing multiple axes of rotation for transversal actuator assembly 40. A wiring harness 146, which extends from the motor 52, can be retained using a mounting strap 148, such as a zip tie, to minimize the force applied on the wiring harness 146 as the transversal actuator assembly 40 and the spreader device 10 move during operation.

Figure 8:
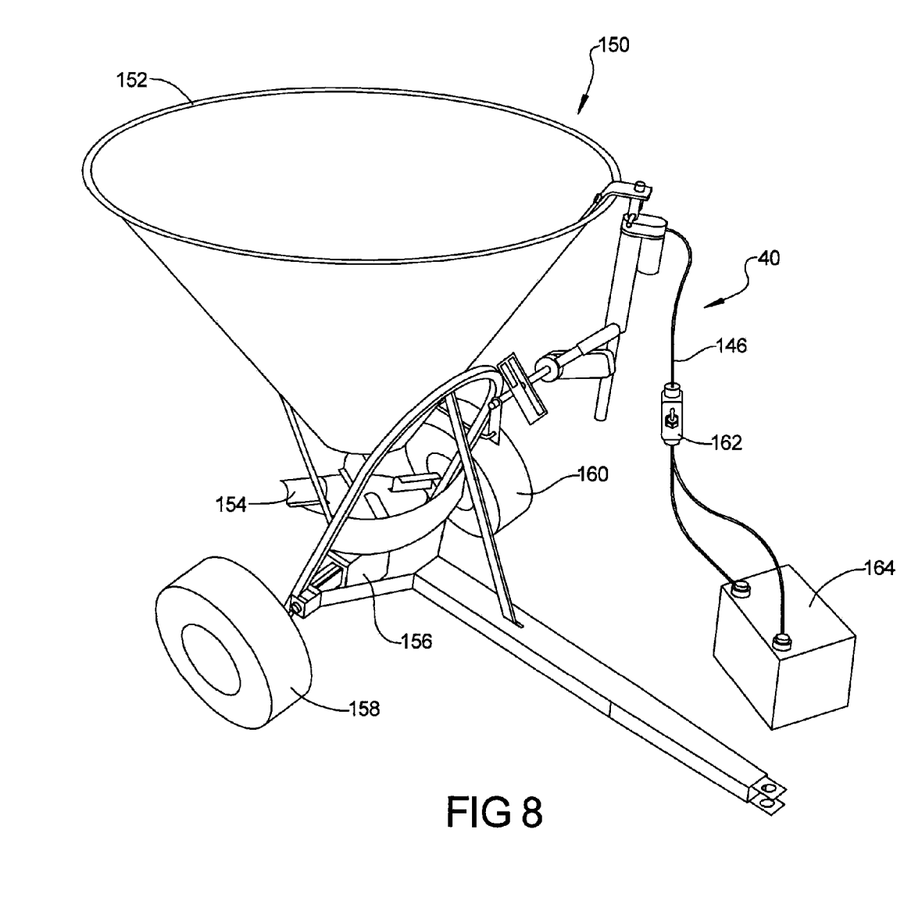
FIG. 8 is a front right perspective view of a traversal actuator assembly of the present disclosure installed on a propulsion actuated spreader.

Referring to FIG. 8 and again to FIGS. 1-7, the transversal actuator assembly 40 of the present disclosure is also adapted to be used on multiple different spreader devices which also include a propulsion powered spreader device 150. The propulsion powered spreader device 150 includes a hopper 152, which is similar to hopper 12 but further includes a throwing device 154 which is rotated by an axle gear assembly 156. The axle gear assembly 156 is powered by rotation of first and second tires 158, 160, thereby providing the motive force for rotation of throwing device 154 independent of the machine used to tow the propulsion powered spreader device 150. An actuator switch device 162, connected to the wiring harness 146, provides local control for operation of the transversal actuator assembly 40 when connected to an actuator power source 164. The actuator power source 164 is depicted as a 12-volt battery; however, the actuator power source can be any source of DC power suitable for operation of the motor 52 provided with transversal actuator assembly 40. The actuator power source 164 is commonly provided with the device used for towing the propulsion powered spreader device 150.

Referring to FIG. 9 and again to FIGS. 1-8, a large capacity spreader 166 is modified from the designs of the previously described spreader devices 10 and propulsion powered spreader device 150 such that a hopper gate control shaft 168 is displaced by horizontal rotation of a horizontally disposed gate control lever 170. The horizontally disposed gate control lever 170 differs from the vertically disposed operation of the previously described gate control lever assembly 20. A modified transversal actuator assembly is therefore provided for connection to the horizontally disposed gate control lever 170, as will be described in greater detail in reference to FIG. 10. As the horizontally disposed gate control lever 170 is rotated in either of a first lever rotation direction "C" or an oppositely directed second lever rotation direction "D", together defining a horizontal arc of rotation of the gate control lever 170, a vertical connecting shaft 172 is directly rotated, defining an axis of rotation directing displacement of the hopper gate control shaft 168.

Figure 9:
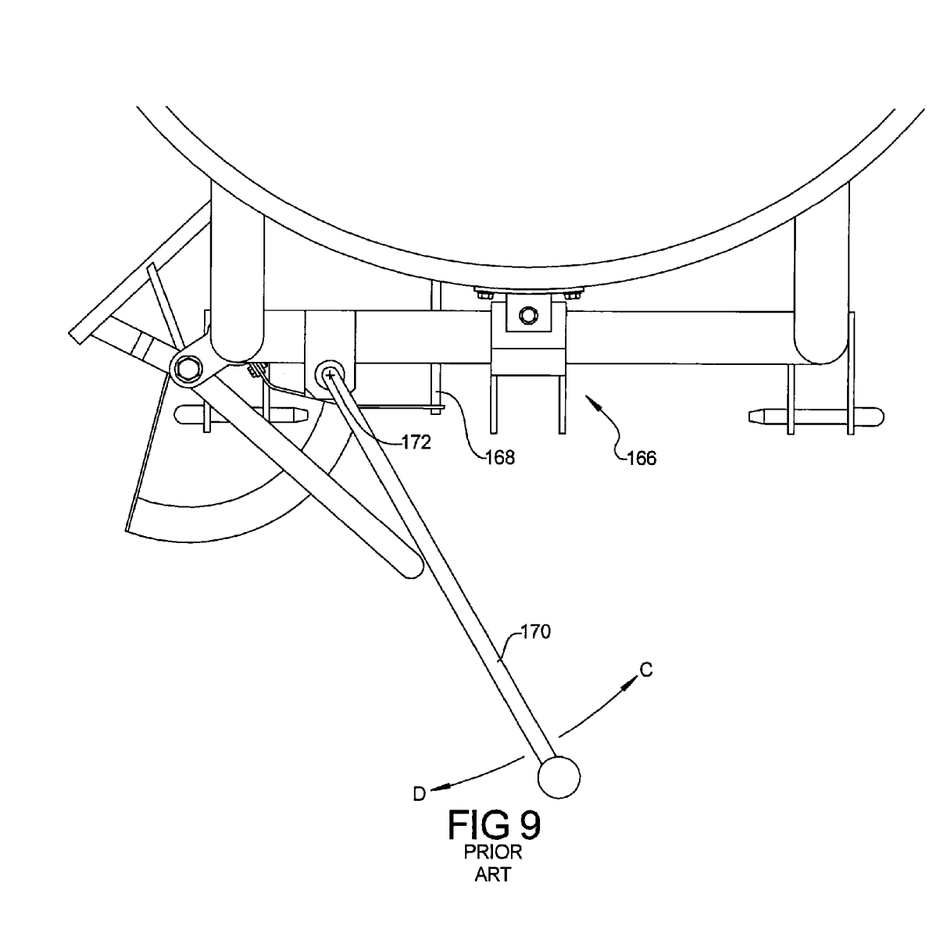
FIG. 9 is top right perspective view of a prior art spreader having a horizontally actuated gate actuator.

Referring to FIG. 10 and again to FIG. 9, the large capacity spreader 166, having the horizontally disposed gate control lever 170, can be automatically controlled by a modified version of the transversal actuator assembly presented as transversal actuator assembly 174. Many of the components of transversal actuator assembly 40 are common with the transversal actuator assembly 174 and are therefore not further discussed. The transversal actuator assembly 174 is mounted to large capacity spreader 166 using a hopper mount bracket 176 which is fixed to a hopper 178. The transversal actuator assembly 174 is therefore substantially horizontally oriented. Hopper mount bracket 176 includes U-shaped bracket wings 180 which receive mounting pin 142' through raised boss 144' to rotatably connect to the drive convertor 50'.

Figure 10:
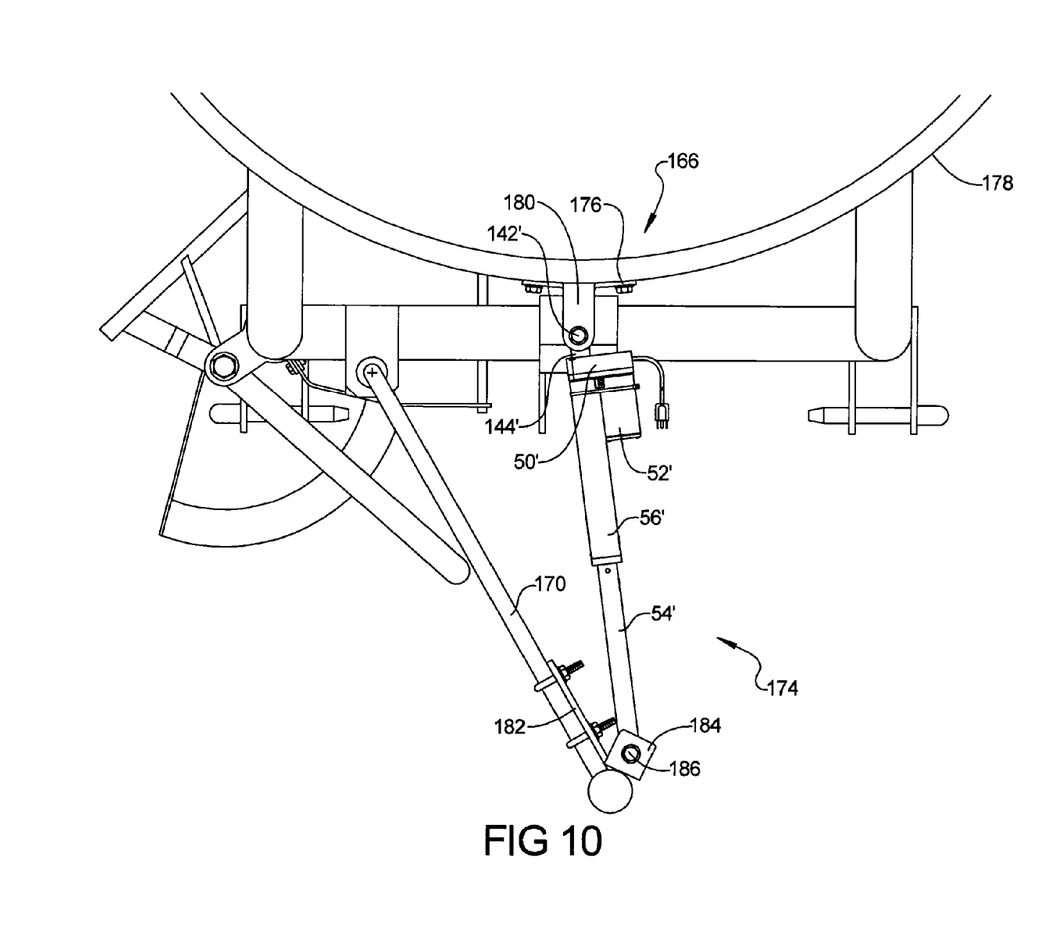
FIG. 10 is a front left perspective view of a traversal actuator assembly of the present disclosure installed on the horizontally actuated gate actuator of FIG. 9.

A separate control lever mount bracket 182 is provided with transversal actuator assembly 174, which is fastened to the horizontally disposed gate control lever 170. A control lever mount bracket 182 includes an angularly disposed U-shaped clevis 184. A clevis mount pin 186 is extended through U-shaped clevis 184 and also disposed through the linear motion shaft 54'. Actuation of motor 52' thereby axially extends or retracts the linear motion shaft 54', which acts to rotate the horizontally disposed gate control lever in either of the first or second lever rotation directions "C", "D". The transversal actuator assembly 174 is therefore substantially horizontally positioned, which is in contrast to the substantially vertically positioned transversal actuator assembly 40. However, the operation of both transversal actuator assemblies is substantially the same.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bulk media spreader transversal actuator assembly, comprising:
   a drive converter;
   a motor connected to the drive converter;
   a linear motion shaft slidably positioned in a shaft housing, the shaft housing connected to the drive converter and the linear motion shaft connected to the drive converter such that rotational operation of the motor is converted to a linear motion of the linear motion shaft by the drive converter; and
   a hyperextension prevention device connected to the linear motion shaft and to a rotatable lever of a bulk media spreader, rotatable displacement of the lever by extension or retraction of the linear motion shaft acting to change an operating position of a hopper gate through which media in the bulk media spreader is dispensed;
   wherein the hyperextension prevention device includes a housing which axially and rotatably receives a rotational motion sleeve, the rotational motion sleeve being cylindrical in shape and rotatable with respect to a rotational axis;
   a first cover plate positioned in contact with a first outer face of the housing retaining the rotational motion sleeve with respect to housing;
   a cylindrically shaped lever connection ring positioned in contact with a second outer face of the housing, the second outer face located opposite to the first cover plate; and
   the cylindrically shaped lever connection ring including a longitudinal slot which receives and matingly engages the lever, the lever retained within the longitudinal slot using a second cover plate which is positioned over the longitudinal slot on the lever connection ring.

2. The bulk media spreader transversal actuator assembly of claim 1, wherein the first cover plate and the second cover plate are coupled together with the cylindrically shaped lever connection ring and the rotational motion sleeve using cover plate fasteners, the lever thereafter being rotatable about the rotational axis defined through the rotational motion sleeve.

3. The bulk media spreader transversal actuator assembly of claim 1, wherein the hyperextension prevention device includes a rotation engagement ball biased into direct contact with an outer wall of the rotational motion sleeve using the biasing force of a biasing member.

4. The bulk media spreader transversal actuator assembly of claim 3, wherein the hyperextension prevention device includes a V-shaped notch in the outer facing wall of the rotational motion sleeve receiving a portion of the rotation engagement ball, thereby acting as a detent against rotation of the rotational motion sleeve, and when a rotational force is produced by displacement of the lever which exceeds the biasing force of the biasing member applied on the rotation engagement ball, the rotation engagement ball is displaced out of the V-shaped notch.

5. The bulk media spreader transversal actuator assembly of claim 3, wherein the hyperextension prevention device includes:
   the biasing member defines a coiled spring slidably positioned within a bore of the housing transversely oriented with respect to the outer wall of the rotational motion sleeve; and
   a tension adjustment screw retained in the bore of the housing, the tension adjustment screw directly contacting the biasing member in the bore and when rotated acting to increase or decrease the biasing force of the biasing member acting on the rotation engagement ball.

6. The bulk media spreader transversal actuator assembly of claim 1, further including:
   a hopper bracket releasably connected to a hopper of the bulk media spreader; and
   a clevis connected to the hopper bracket and rotatable with respect to the hopper bracket, the drive converter connected to the clevis by a pin, the pin allowing rotational movement of the drive converter with respect to the clevis.

7. The bulk media spreader transversal actuator assembly of claim 1, further including a mounting pin rotatably connecting a free end of the linear motion shaft to the hyperextension prevention device such that the linear motion shaft is rotatably coupled with the hyperextension prevention device; with the hyperextension prevention device rotatably engaged to the rotatable lever of the bulk media spreader.

8. A bulk media spreader transversal actuator assembly, comprising:
   a drive converter;
   a motor connected to the drive converter;
   a linear motion shaft slidably positioned in a shaft housing, the shaft housing connected to the drive converter and the linear motion shaft connected to the drive converter such that rotational operation of the motor is converted to a linear motion of the linear motion shaft by the drive converter;
   a hyperextension prevention device rotatably connected to the linear motion shaft and rotatably connected to a rotatable lever of a bulk media spreader, rotatable displacement of the lever by extension or retraction of the linear motion shaft acting to change an operating position of a hopper gate through which media in the bulk media spreader is dispensed; and
   a detent position of the hyperextension prevention device provided by engagement of a rotation engagement ball in a V-shaped notch resisting rotation of the hyperextension prevention device until a biasing force of a biasing member engaged with the rotation engagement ball is exceeded by a rotational force acting on the hyperextension prevention device through the lever;

wherein the hyperextension prevention device includes a housing which axially and rotatably receives a rotational motion sleeve, the rotational motion sleeve being cylindrical in shape and rotatable with respect to a rotational axis;

a lever connection ring rotatably connected to the housing and including a longitudinal slot which receives and matingly engages the lever; and a first cover plate positioned in contact with a first outer face of the housing retaining the rotational motion sleeve with respect to the housing;

wherein the lever connection ring is cylindrically shaped and positioned on the side of the housing opposite to the first cover plate, is mounted in proximity to a second outer face of the housing which is positioned opposite to the first outer face of the housing; and the lever is retained within the longitudinal slot using a second cover plate which is positioned over the longitudinal slot on the lever connection ring.

9. The bulk media spreader transversal actuator assembly of claim 8, wherein the V-shaped notch is positioned in an outer facing wall of the rotational motion sleeve and receives a portion of the rotation engagement ball, thereby acting as a detent against rotation of the rotational motion sleeve.

\* \* \* \* \*